April 26, 1960
A. W. GAUBATZ
2,934,367
ACCESSORY MOUNT
Filed March 5, 1956
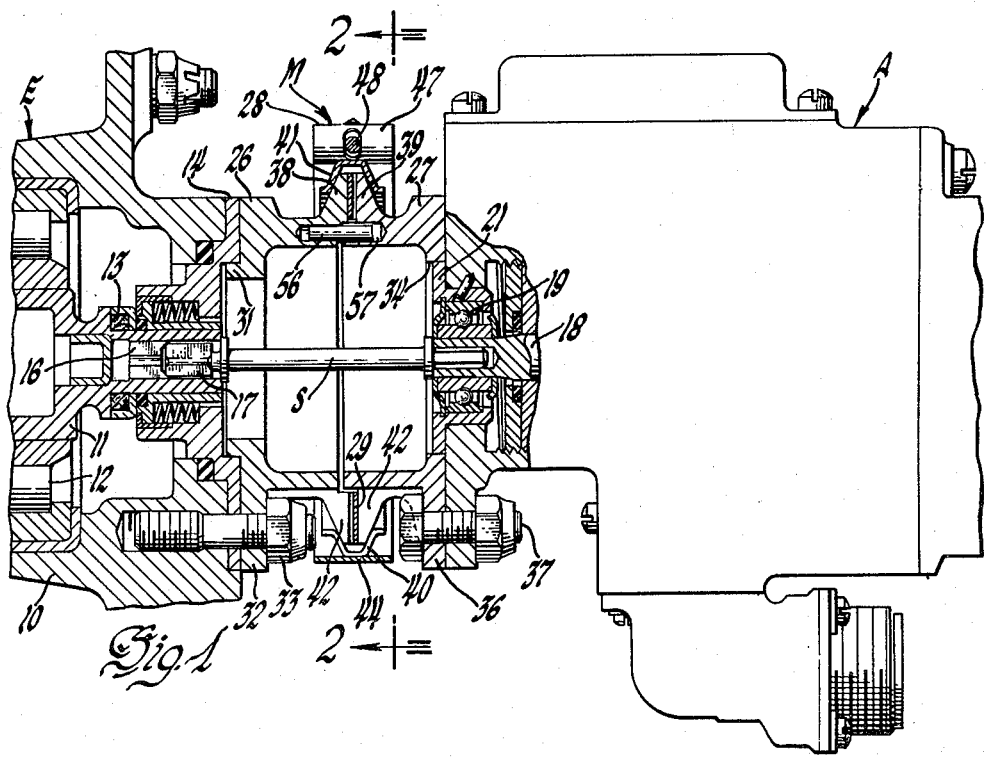
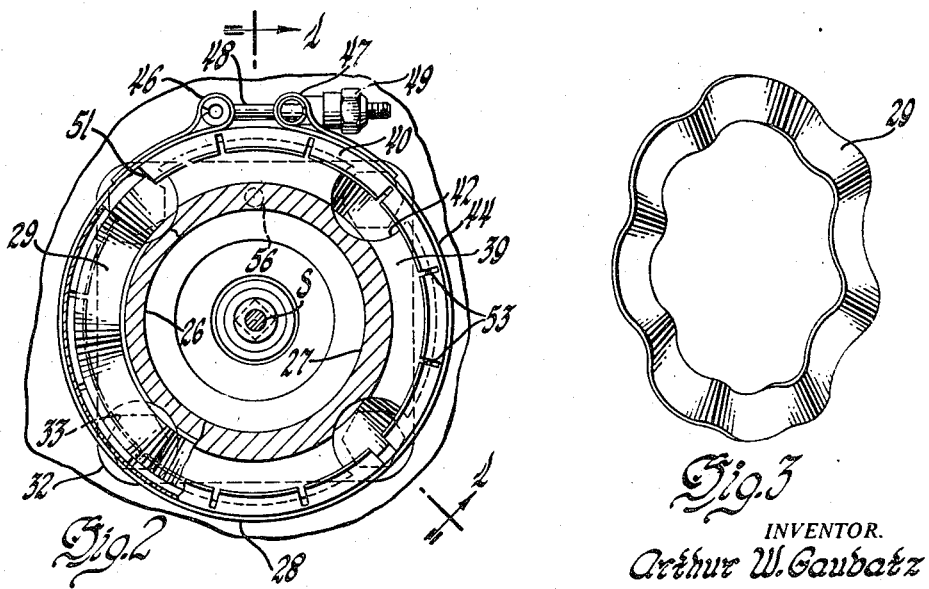
INVENTOR.
Arthur W. Gaubatz
BY
Paul Fitzpatrick
ATTORNEY.

United States Patent Office 2,934,367
Patented Apr. 26, 1960

2,934,367

ACCESSORY MOUNT

Arthur W. Gaubatz, Indianapolis, Ind., assignor to General Motors Corporation, Detroit, Mich., a corporation of Delaware Application March 5, 1956, Serial No. 569,654

2 Claims. (Cl. 287—130)

This invention relates to mounts or supports having vibration damping characteristics which are particularly adapted for supporting engine accessories or the like on engines which are characterized by relatively high frequency vibration in service. A particular use for which the invention is adapted, and in terms of which it is described in the succeeding specification, is a mount for a speed responsive switch device which is an accessory for a gas turbine aircraft engine.

Such engines include turbines and compressors which ordinarily rotate at high speed. While the rotating structures must be carefully balanced, some vibration is inevitable. Also, the usual gearing which drives the engine accessories may set up gear-tooth vibration of high pitch and significant amplitude. Other vibration sources may give trouble. The prior practice has been to mount the speed switch rigidly on the engine, and it has been found that such vibration adversely affects the operation of the speed switch by causing chatter of the switch contacts and wear of the operating parts.

The present invention involves the interposition of a mount between the engine and the speed switch serving as a cantilever support for the switch, which mount includes parts which are aligned with sufficient accuracy to preserve proper alignment of the speed switch with the shaft which drives it but which parts are capable of relative shifting movement accompanied by friction which damps vibration of the speed switch excited by vibration in the engine. Thus, the mount must provide a reasonable degree of positive alignment of the supported device to permit transmission of power from the engine to the device, notwithstanding inertia loads which may be due to maneuvers of an aircraft in which the engine is mounted, but there must be limited relative movement accompanied by friction.

The principal objects of the invention are to improve the performance of engine accessories and to provide a mount for an engine accessory which is sufficiently rigid to support the accessory but which permits some relative motion and damps the relative motion to inhibit transmission of vibration from the engine to the accessory.

The nature of the invention and the advantages thereof will be clearly apparent to those skilled in the art from the succeeding description of preferred embodiments of the invention and the accompanying drawings in which:

Figure 1 is a view, with parts in section, of a speed switch supported in accordance with the invention on an engine only a fragmentary portion of which is illustrated;

Figure 2 is a transverse sectional view taken on the plane indicated by the line 2—2 in Figure 1; and Figure 3 is a perspective view of an annular wavy spring.

Figure 1 shows a fragmentary part of an engine E, which may be part of an accessory drive case ordinarily included in such engines, an accessory device A, which specifically may be a speed responsive switch such as that disclosed in the prior application of Arthur W. Gaubatz, Serial No. 352,453, filed May 1, 1953 (Patent No. 2,786,- 667), a mount M by which the speed switch is supported on the engine, and the coupling shaft S by which the switch is driven. It is to be understood that the internal structure of the engine and the speed switch are immaterial to the invention, which is directed to the connection between them.

The engine includes a case or housing 10 in which a shaft 11 driven in any suitable manner is rotatably supported by bearing 12. An oil seal 13 cooperating with the shaft is supported by a plate 14 which pilots into a circular opening in the housing 10 through which the end of shaft 11 projects. The interior of the end portion of shaft 11 has a square form indicated at 16 so as to receive and drive the square end 17 of shaft S. The other end of shaft S, which is hexagonal, is received in a hexagonal hole in the end of the operating shaft 18 of speed switch A, which is supported by a bearing 19 mounted in a cage 21.

The mount or coupling M comprises four principal parts; a first annular body 26 fixed to the engine, a second annular body 27 fixed to the accessory device, a ring clamp 28 of the V-band type which couples the bodies 26 and 27 together, and an annular wavy spring 29 interposed between the bodies. The body 26 has a projecting flange 31 which pilots within a recess in the plate 14 and has a flange or ears 32 fixed to the engine by nuts and studs 33. The body 27 has an internal bore 34 which pilots over the flange of bearing cage 21 of the speed switch. A flange 36 of body 27 is fixed to the speed switch by bolts and nuts 37. The bodies 26 and 27 have flanges 38 and 39, respectively, at their adjacent ends. The outer surfaces of the flanges are conical to mate with the flanges 41 of the inner ring 40 of V-band clamp 28. The inner or opposed faces of the flanges 38 and 39 are radial. These faces engage the annular wavy spring 29 which is shown more clearly in Figure 3. As will be apparent, this spring is sinuous so that it engages the faces of the flanges alternately and is capable of limited compression, thus providing a resilient connection between the two bodies.

The flanges 38 and 39 are cut away at four points indicated at 42 to provide access to the nuts 33 and bolts 37. The V-band clamp 28 is of a well known commercial type except for a modification to be described. In addition to the V-shaped band 40 there is an outer or tension band 44, the ends of which are provided with loops 46 and 47. A T-headed bolt 48 has its head mounted in the loop 46. The bolt extends through the loop 47 and the clamp is tightened by a nut 49 threaded on the bolt. There is a gap indicated at 51 in Figure 2 in the V-band 40 so that it may be tightened on the flanges 38 and 39. As will be apparent, the engagement of the conical surfaces of the band 40 with the conical surfaces of the flanges 38 and 39 holds the two bodies together and also aligns the axes of the two bodies so as to align the speed switch with the driving shaft 11. The coupling of shaft S to the shafts 11 and 18 is slightly loose so that some relative movement is permitted. When the V-band clamp is tightened, the bodies are held in alignment but are held apart by the wavy spring 29.

The flanges 41 of the V-band clamp are slotted as indicated at 53 in Figure 2 to increase the resilience of the clamp. It is not desired that the joint between the bodies 26 and 27 be too tight, since the slip between the two bodies which involves friction between the flanges of the body and the flanges of the clamp and some friction between the faces of the bodies and the spring 29 is relied upon to absorb energy and thus damp vibration which otherwise would be transmitted from the engine to the speed switch.

In order to index the speed switch properly and prevent possible rotation, the two bodies 26 and 27 are nonrotatively coupled by a pin 56 pressed into body 26 and received with clearance in a drilled hole 57 in body 27.

It will be apparent from the foregoing description that the mount described is adapted to support the speed switch with sufficient rigidity to maintain its position on the engine and support it against acceleration loads but will permit slight slip between the bodies 26 and 27 opposed by the friction of the V-band clamp and the wavy spring which will absorb energy and damp vibrations which otherwise might be set up and which might impair the accuracy of the speed switch. The stiffness of the coupling and thus the amount of frictional damping can be varied by simply varying the tightness of the clamp by tightening or loosening nut 49.

The detailed description of the preferred embodiment of the invention for the purposes of explaining the principles thereof is not to be construed as limiting the invention, as many modifications may be made by the exercise of skill in the art within the principles of the invention.

I claim:

1. A vibrational energy absorbing cantilever mount adapted to fix a supported device to a supporting structure comprising a first body rigid with the device and a second body rigid with the structure, the bodies having opposed adjacent annular faces; an undulated ring spring mounted between and engaging the said faces, the spring biasing the bodies apart and being axially expansible and compressible in response to relative movement of the bodies; the bodies having flanges adjacent the faces defining conical surfaces directed mutually away from each other; and a V-band clamp including an open outer tension band encircling the flanges, means connecting the ends of the band adjustable to vary the tension of the band, and an open V-section band fixed within the tension band having flanges embracing and frictionally engaging the said conical surfaces of the flanges of the bodies, the flanges of the V-section band being radially slotted to provide circumferentially spaced spring fingers flexible in a direction axially of the clamps biasing the bodies axially together in opposition to the ring spring, the effective strength of the spring fingers being variable by varying the tension of the tension band with resulting variation of the frictional resistance to relative vibration of the bodies exerted by the ring spring and the spring fingers.

2. A vibrational energy absorbing cantilever mount adapted to fix a supported device to a supporting structure comprising a first body rigid with the device and a second body rigid with the structure, the bodies having opposed adjacent annular faces; a yieldable annular contorted spring means mounted between and engaging the said faces, the spring means biasing the bodies apart and being axially expansible and compressible in response to relative movement of the bodies; the bodies having flanges adjacent the faces defining conical surfaces directed mutually away from each other; and a V-band clamp including an open outer tension band encircling the flanges, means connecting the ends of the band adjustable to vary the diameter of the band, and an open V-section band fixed within the tension band having flanges embracing and frictionally engaging the said conical surfaces of the flanges of the bodies, the flanges of the V-section band being radially slotted to provide circumferentially spaced spring fingers flexible in a direction axially of the clamp biasing the bodies axially together in opposition to the contorted spring means, the effective strength of the spring fingers being variable by varying the diameter of the tension band and thereby of the V-section band so as to vary the spread of the spring fingers effected by the conical surfaces with resulting variation of the frictional resistance exerted by the contorted spring means and the spring fingers.

References Cited in the file of this patent

UNITED STATES PATENTS

| | | |
|---|---|---|
| 694,648 | Jordan et al. | Mar. 4, 1902 |
| 1,769,967 | Saurman et al. | July 8, 1930 |
| 2,236,496 | Beggs | Apr. 1, 1941 |
| 2,421,529 | Tyler | June 3, 1947 |
| 2,693,380 | Flanagan | Nov. 2, 1954 |

FOREIGN PATENTS

| | | |
|---|---|---|
| 108,937 | Great Britain | Aug. 30, 1917 |
| 710,018 | Great Britain | June 2, 1954 |